United States Patent
Jang et al.

(10) Patent No.: US 8,358,618 B2
(45) Date of Patent: Jan. 22, 2013

(54) METHOD FOR RESUMING SERVICES IN A WIRELESS COMMUNICATION SYSTEM

(75) Inventors: Sung-Tak Jang, Bucheon-si (KR); Chang-Yeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 12/592,313

(22) Filed: Nov. 23, 2009

(65) Prior Publication Data

US 2010/0135227 A1 Jun. 3, 2010

(30) Foreign Application Priority Data

Nov. 28, 2008 (KR) .................. 10-2008-0119929

(51) Int. Cl.
*H04W 4/00* (2009.01)
(52) U.S. Cl. ..................... 370/329; 455/435.1

(58) Field of Classification Search .................. None
See application file for complete search history.

(56) References Cited

U.S. PATENT DOCUMENTS

| | | | | |
|---|---|---|---|---|
| 2006/0203712 A1* | 9/2006 | Lim et al. | ...................... | 370/208 |
| 2006/0233198 A1* | 10/2006 | Kim et al. | ...................... | 370/469 |
| 2007/0201399 A1* | 8/2007 | Lee et al. | ...................... | 370/329 |
| 2007/0281720 A1* | 12/2007 | Lee | .............................. | 455/466 |
| 2008/0317033 A1* | 12/2008 | Lee et al. | ...................... | 370/393 |
| 2009/0135779 A1* | 5/2009 | Moon et al. | ................... | 370/329 |
| 2011/0188432 A1* | 8/2011 | Yin | ................................ | 370/311 |

* cited by examiner

*Primary Examiner* — Anh-Vu Ly

(57) ABSTRACT

A method for operating a Base Station (BS) in a wireless communication system includes, when a bandwidth request message is received from a Mobile Station (MS), whether a resource allocated to the MS exists is determined. When the resource allocated to the MS does not exist, a resource is temporarily allocated to the MS. A message indicating a network initial entry is transmitted to the MS using the temporarily allocated resource.

13 Claims, 3 Drawing Sheets

METHOD FOR RESUMING SERVICES IN A WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Nov. 28, 2008 and allocated Serial No. 10-2008-0119929, the entire disclosure of which is hereby incorporated by reference.

TECHNICAL FIELD OF THE INVENTION

The present invention relates to a wireless communication system. More particularly, the present invention relates to a method for resuming a service when a state mismatching between a Base Station (BS) and a Mobile Station (MS) occurs in a wireless communication system.

BACKGROUND OF THE INVENTION

In a current communication system, a study for providing services having various Quality of Services (QoS) of high speed to users is in active progress. Recently, research and development of a broadband wireless communication system called a 4-th Generation (4G) communication system, such as a wireless Local Area Network (LAN) system and a wireless Metropolitan Area Network (MAN), or an Institute of Electrical and Electronics Engineers (IEEE) 802.16e communication system are in active progress.

FIG. 1 illustrates a view of a conventional broadband wireless communication system.

Referring to FIG. 1, Access Control Routers (ACRs) 120 and 122 of the broadband wireless communication system are connected with an Internet Protocol (IP) Network 130, and Base Stations (BSs) 110 to 116. The ACRs 120 and 122 transmit/receive data to/from Mobile Stations (MSs) 100 to 106 via a wireless interface at a wired network terminal. That is, the ACRs 120 and 122 control the MSs 100 to 106, and the BSs 110 to 116, and route an IP packet. Additionally, the ACRs 120 and 122 cooperate with the BSs 110 and 116, manage mobility of the MSs 100 to 106, generate/inform charging and statistical information, provide QoS, and manage/control authentication/security and wireless resources. Each of the BSs 110 to 116 is connected with the MSs 100 to 106 for receiving a subscriber service to form a wireless section. The BSs 110 to 116 perform a call process for setting, maintaining, and releasing call connection of a packet, and are responsible for a handover, a system control, and matching of an additional device.

When a message to be transmitted/received is lost, an error occurs during a handover, or an error occurs in an internal resource of the BS 110 while the BS 110 and the MS 100 transmit/receive data to/from each other, a resource allocated by the BS 110 to the MS 100 that is in an active state may be deleted due to resource state mismatching between the BS 110 and the MS 100. A phenomenon that a resource allocated to the MS 100 is improperly deleted may occur in various circumstances besides the above-described case.

When the resource is deleted, the MS 100 cannot receive a data service. When the MS 100 has data or a message to be transmitted to an uplink, the MS 100 transmits a Bandwidth Request Header (BRHdr) requesting a BS to allocate a bandwidth in order to obtain an uplink allocation. At this point, the BS 110 that has received the BRHdr determines a Basic Connection IDentifier (BCID) included in the BRHdr, and ignores the bandwidth allocation request because a currently allocated resource does not exist in the MS 100. Here, the BCID is an identifier of the MS used when the MS performs an initial ranging and transmits/receives a Media Access Control (MAC) management message.

When the above-described procedure continues, the MS 100 cannot receive a service any more, and repeatedly and constantly transmits the BRHdr to the BS 110. This is because the MS 100 cannot recognize a state mismatching between the MS 100 and the BS 110. To resolve this mismatching, an event, such as re-authentication and network re-entry, should occur. However, under the above-described circumstance, the state mismatching between the MS 100 and the BS 110 cannot be resolved because the MS 100 cannot detect a current state.

SUMMARY OF THE INVENTION

To address the above-discussed deficiencies of the prior art, it is a primary aspect of the present invention to provide a method for resolving mismatching between a BS and an MS in a wireless communication system.

Another aspect of the present invention is to provide a method for allowing a BS to command an MS to perform a network initial entry in a wireless communication system.

In accordance with an aspect of the present invention, a method for operating a Base Station (BS) in a wireless communication system is provided. The method includes: when a bandwidth request message is received from a Mobile Station (MS), determining whether a resource allocated to the MS exists; when the resource allocated to the MS does not exist, temporarily allocating a resource to the MS; and transmitting a message indicating a network initial entry to the MS using the temporarily allocated resource.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
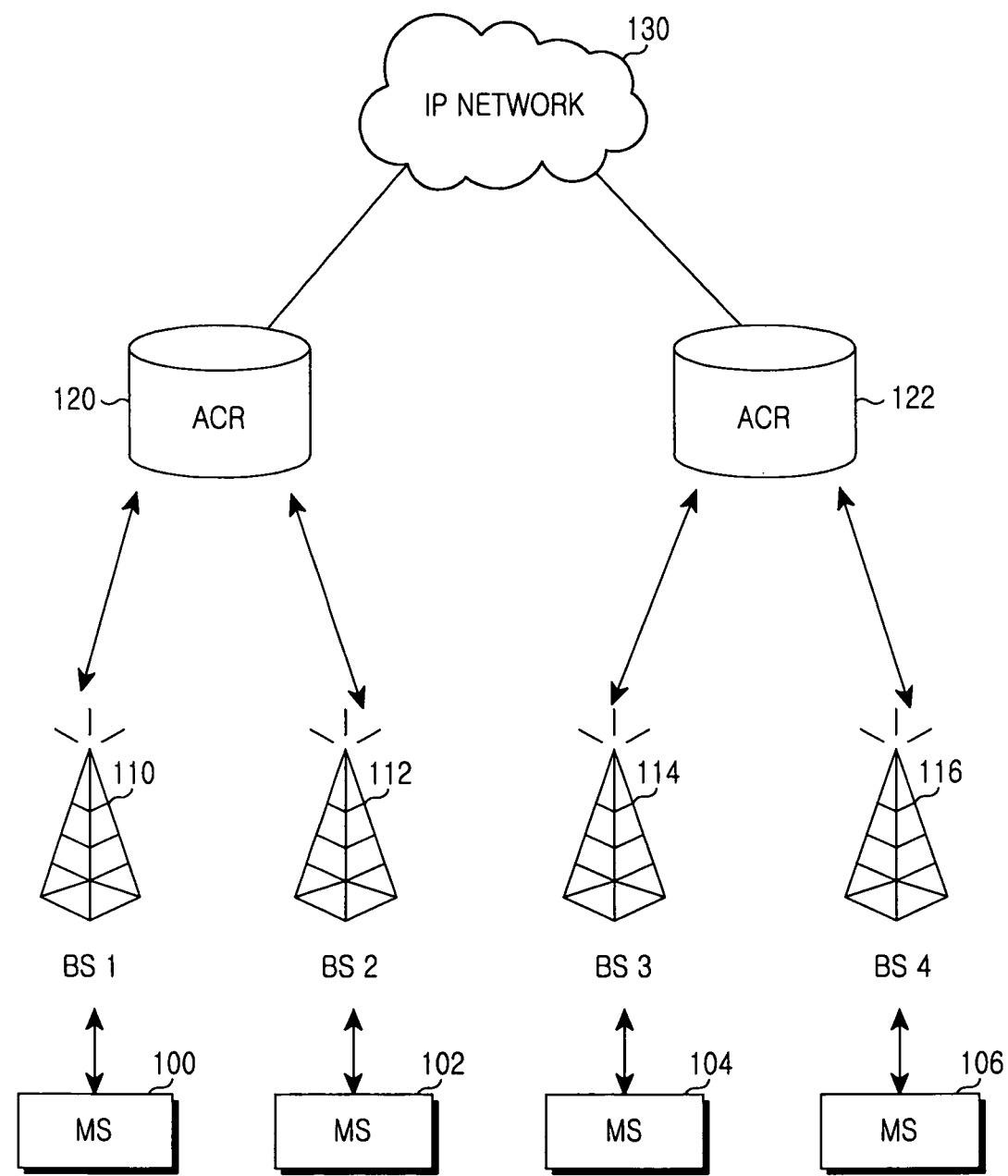
FIG. 1 illustrates a view of a conventional broadband wireless communication system.
Figure 2:
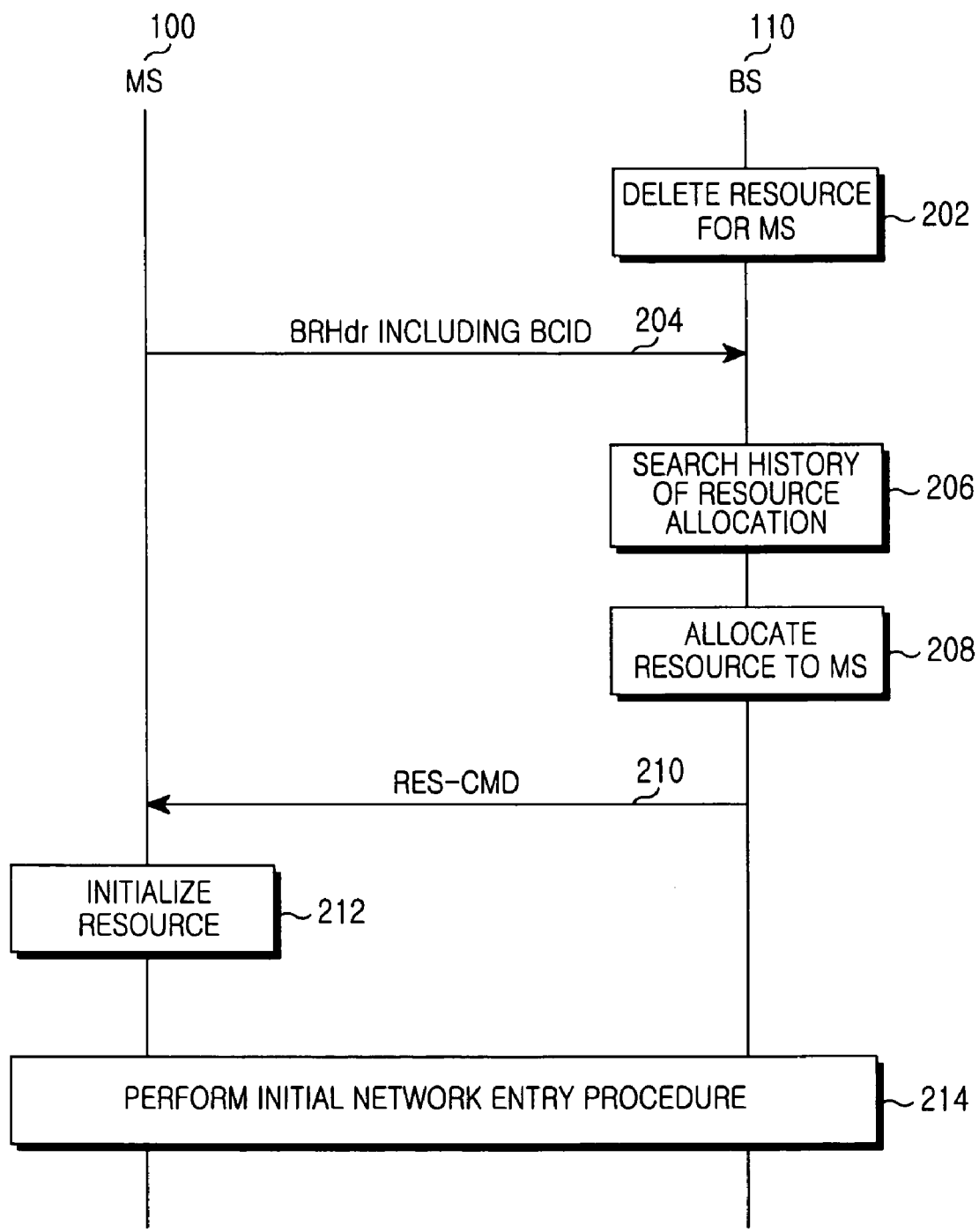
FIG. 2 illustrates a procedure for transmitting/receiving a message during a state mismatch between a BS and an MS in a broadband wireless communication system according to an exemplary embodiment of the present invention.
Figure 3:
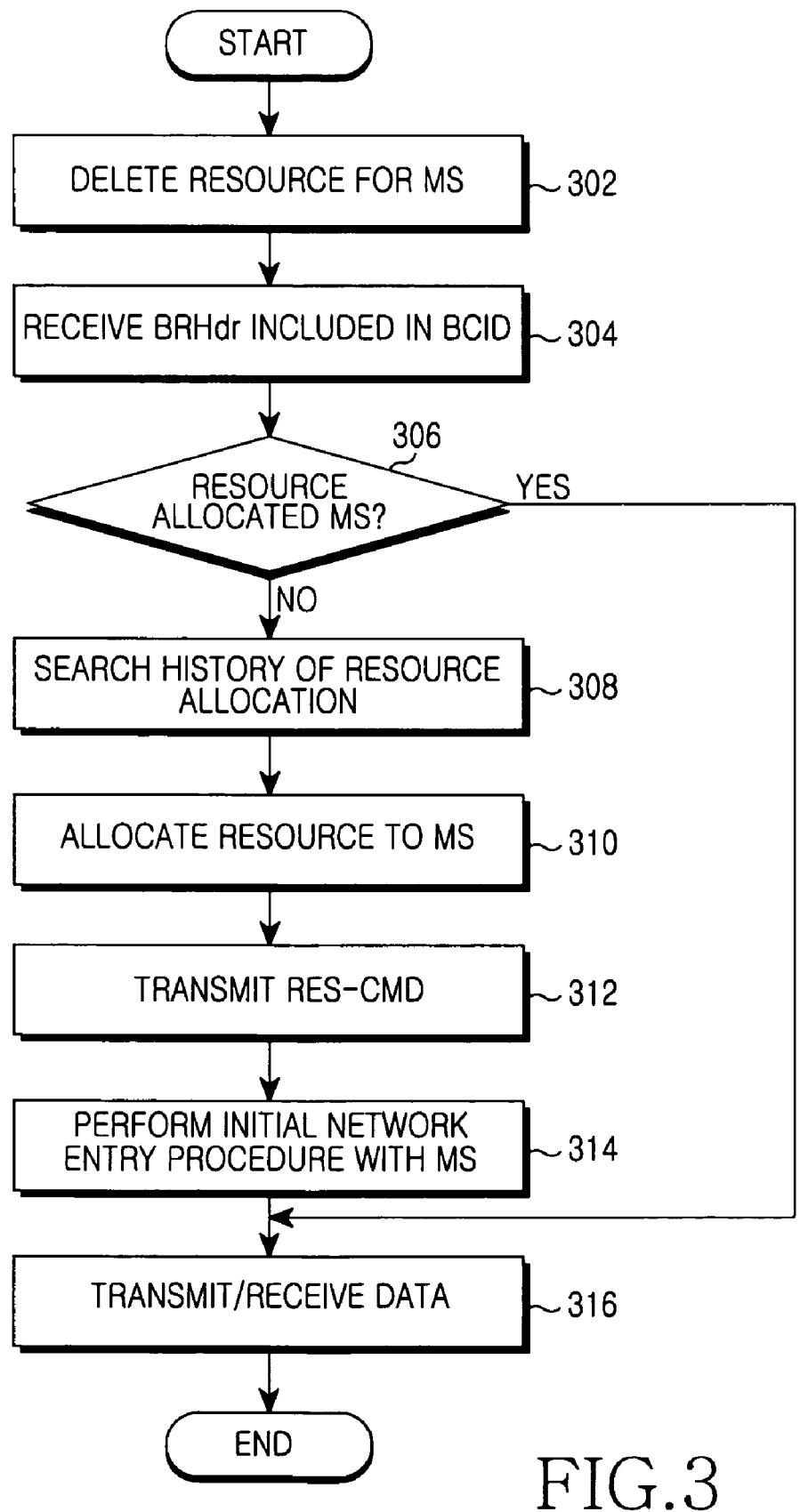
FIG. 3 illustrates an operating procedure of a BS according to an exemplary embodiment of the present invention.

FIGS. 2 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a method for processing a state mismatching between a BS and an MS in a broadband wireless communication system. The present invention is described using an Orthogonal Frequency Division Multiplexing (OFDM)/Orthogonal Frequency Division Multiple Access (OFDMA) wireless communication system as an example, and is applicable to a wireless communication system of a different scheme.

A message transmission/reception procedure and an operation and a construction of an exemplary embodiment of the present invention are described in more detail with reference to the accompanying drawings.

FIG. 2 illustrates a procedure for transmitting/receiving a message during a state mismatch between a BS and an MS in a broadband wireless communication system according to an exemplary embodiment of the present invention.

Referring to FIG. 2, the BS 110 deletes a resource for the MS 100 that is in an active state due to a reason of the above-described message loss or internal error in step 202. The deletion of the resource may be performed by a different reason other than the above-described reason. Therefore, a state mismatching between the MS 100 and the BS 110 occurs. The MS 100 that includes user data or a message to be transmitted to an uplink transmits a BRHdr to the BS 110 in order to request a bandwidth required for uplink transmission in step 204. The BS 110 that has received the BRHdr recognizes that a resource allocated to the MS 100 has been deleted by determining the BCID included in the BRHdr, and searches a history of a past resource allocation using the BCID in step 206. The BS 110 temporarily allocates a resource to the MS 100 in step 208, and transmits a RESet CoMmanD (RES-CMD) message to the MS 100 using the temporarily allocated resource in step 210. The MS 100 that has received the RES-CMD message initializes an MAC resource by performing an initial operation by itself in step 212, and performs a network initial entry procedure with the BS 110 in step 214.

FIG. 3 illustrates an operating procedure of a BS according to an exemplary embodiment of the present invention.

Referring to FIG. 3, the BS deletes a resource for the MS that is in an active state due to a reason of the above-described message loss or internal error in step 302. At this point, the MS having user data or a message to be transmitted to an uplink transmits a BRHdr to the BS in order to request a bandwidth required for uplink transmission. The BS receives the BRHdr in step 304. The BS that has received the BRHdr determines whether the MS is an MS to which a resource has been allocated by determining a BCID included in the BRHdr in step 306. When the MS is an MS to which a resource has been currently allocated as a result of the determination of the BCID, the BS normally performs data transmission/reception with the MS in step 316. Alternatively, when the MS is not an MS to which a resource has been currently allocated but an MS for which a resource has been deleted as a result of the determination of the BCID, the BS searches a history of past resource allocation for the MS in step 308. Through the above-described procedure, the BS recovers the resource that was allocated to the MS and temporarily allocates the resource in step 310. Subsequently, the BS transmits an RES-CMD message to the MS via the temporarily allocated resource in step 312. The BS performs a network initial entry procedure with the MS in step 314, and normally transmits/receives data with the MS in step 316.

In the exemplary embodiment of the present invention described with reference to FIGS. 2 and 3, the BS transmits an RES-CMD message in order to allow the MS to initialize a resource. The RES-CMD message is a message for commanding an MS to perform initialization, and may be configured as in Table 1.

TABLE 1

| Syntax | Size |
|---|---|
| RES-CMD_Message_Format( ) { | — |
|    Management Message Type = 25 | 8 |
|    TLV encoded information | variable |
| } | — |

According to an exemplary embodiment of the present invention, the BS may transmit a different message other than the RES-CMD message. For example, a RaNGing ReSPonse (RNG-RSP) message including an abort Type Length Value (TLV), or a DeREGistration CoMmanD (DREG-CMD) message may be used.

As described above, when a BRHdr is received from an MS for which a resource has been deleted, a BS does not ignore the BRHdr but searches a history of past resource allocation to allocate a temporary resource, and transmits an RES-CMD message to the MS. Therefore, the BS allows the MS to recognize state mismatching between the BS and the MS and performs a network initial entry procedure. That is, a problem that the MS cannot recognize this state mismatching and repeatedly transmits a BRHdr is resolved, and a normal service resume becomes possible swiftly.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a Base Station (BS) in a wireless communication system, the method comprising:
   determining whether at least one resource is currently allocated to a Mobile Station (MS) when a bandwidth request message is received from the MS;
   temporarily allocating a resource to the MS when the MS is not currently but was previously allocated the at least one resource; and
   transmitting a message indicating a network initial entry to the MS using the temporarily allocated resource.

2. The method of claim 1, wherein temporarily allocating comprises:
   searching a history of past resource allocation for the MS.

3. The method of claim 2, wherein temporarily allocating further comprises:
   temporarily allocating a resource to the MS by recovering a resource that was allocated to the MS.

4. The method of claim 1, wherein determining whether the at least one resource is currently allocated to the MS comprises:
   determining an identifier of the MS included in the bandwidth request message; and
   determining whether a resource allocated to the MS having the identifier exists.

5. The method of claim 4, wherein the bandwidth request message comprises a Bandwidth Request Header (BRHdr), and the identifier comprises a Basic Connection IDentifier (BCID).

6. The method of claim 1, wherein the message indicating the network initial entry comprises one of a RESet CoMmanD (RES-CMD) message, a RaNGing ReSPonse (RNG-RSP) message comprising an abort Type Length Value (TLV), and a DeREGistration CoMmanD (DREG-CMD) message.

7. The method of claim 1, further comprising, after the transmitting of the message indicating the network initial entry, performing a network initial entry procedure with the MS.

8. A wireless communication system, the system comprising:
   a Mobile Station (MS) configured to transmit a bandwidth request message to at least one Base Station (BS); and
   the at least one BS configured to:
      determine whether at least one resource is currently allocated to the MS when the bandwidth request message is received from the MS,
      temporarily allocate a resource to the MS when the MS is not currently but was previously allocated the at least one resource, and
      transmit a message indicating a network initial entry to the MS using the temporarily allocated resource.

9. The system of claim 8, wherein the at least one BS is configured to:
   search a history of past resource allocation for the MS; and
   temporarily allocate a resource to the MS by recovering a resource that was allocated to the MS.

10. The system of claim 8, wherein the at least one BS is configured to:
    determine an identifier of the MS included in the bandwidth request message; and
    determine whether a resource allocated to the MS having the identifier exists.

11. The system of claim 10, wherein the bandwidth request message comprises a Bandwidth Request Header (BRHdr), and the identifier comprises a Basic Connection IDentifier (BCID).

12. The system of claim 8, wherein the message indicating the network initial entry comprises one of a RESet CoMmanD (RES-CMD) message, a RaNGing ReSPonse (RNG-RSP) message comprising an abort Type Length Value (TLV), and a DeREGistration CoMmanD (DREG-CMD) message.

13. The system of claim 8, wherein the MS configured to initiate a resource upon receiving the message indicating a network initial entry, and
    the at least one BS configured to perform a network initial entry procedure with the MS.

* * * * *